United States Patent [19]

Olsen et al.

[11] Patent Number: 4,615,874

[45] Date of Patent: Oct. 7, 1986

[54] PROCESS FOR PRODUCING CHLORINE FROM FERRIC CHLORIDE

[75] Inventors: Richard S. Olsen, Albany; Glenn C. Brown, Corvallis, both of Oreg.

[73] Assignee: The United States of America as represented by the Secretary of the Interior, Washington, D.C.

[21] Appl. No.: 716,440

[22] Filed: Mar. 27, 1985

[51] Int. Cl.$^4$ ................................................ C01B 7/00
[52] U.S. Cl. .................................... 423/502; 423/500
[58] Field of Search ................................ 423/500, 502

[56] References Cited

U.S. PATENT DOCUMENTS 4,055,621 10/1977 Okudaira et al. .................... 423/500
4,174,381 11/1979 Reeves et al. ........................ 423/502

*Primary Examiner*—Curtis R. Davis
*Attorney, Agent, or Firm*—E. Philip Koltos; Thomas Zack

[57] ABSTRACT

A process for forming chlorine gas from ferric chloride powders comprising pelletizing the ferric chloride and reacting the pellets with oxygen gas at a temperature in the range of 650° to 800° C.

8 Claims, No Drawings

PROCESS FOR PRODUCING CHLORINE FROM FERRIC CHLORIDE

BACKGROUND OF THE INVENTION

The ore ilmenite contains mostly titanium, iron, and oxygen. In order to remove the titanium, the ore is reacted with chlorine and carbon to produce $TiCl_4$, $FeCl_3$ and CO and $CO_2$. The carbon in the process ties up the oxygen in the ore. The ferric chloride gas is separated from the titanium chloride gas by condensation of the ferric chloride at 315° C. which is its boiling point. The titanium tetrachloride is then converted to $TiO_2$ which finds wide use in the paint pigment and specialized metals industries. As can be appreciated, this process, which is the basic process for producing titanium products, creates a large amount of ferric chloride by-product. The disclosure of U.S. Pat. No. 4,144,316 discloses a process for taking the chlorine out of ferric chloride. Ferric chloride is a by-product of the process for producing titanium oxide and titanium metals. It is highly desirable to remove the chlorine from the ferric compound and reuse it in the process for producing $TiCl_4$. However, the processes for doing that have been bogged down with difficulties. First of all, ferric chloride is highly corrosive, making even its disposal difficult. Furthermore, it is highly hygroscopic. Accordingly, the process for recovering $Cl_2$ gas by burning ferric chloride with oxygen has been beset with many difficulties.

Other problems have been the plug-up and fouling of equipment. In addition, the ferric oxide that is formed by such a process has added to the difficulty by scaling the walls of the reactor.

Accordingly, it is one object of the present invention to produce a simple and effective process for removing chlorine from ferric chloride.

It is another object to produce an economic process for removing chlorine from ferric chloride.

It is still another object of the present invention to produce a process for effectively handling ferric chloride.

These and other objects are accomplished by means of the disclosure hearing below.

SUMMARY OF THE INVENTION

It has been found that ferric chloride is much easier to handle and have the chlorine removed from it if it is first formed into pellets. Then the pellets are reacted with oxygen gas at a temperature of 650° C. to 800° C. to produce chlorine gas and ferric oxide. It has been found that if the process is carried out in a fluidized bed reactor, in most cases the fouling of the equipment does not occur.

DESCRIPTION OF THE PREFERRED EMBODIMENT

The pellets can be made in any convenient pelletizing apparatus to the size of 1 to 6 mm in diameter. Such apparatus that can be used to pelletize ferric chloride are, for instance, manufactured and sold by the California Pellet Mill Co., San Francisco, Calif. and Ferro-Tech Sales Corp., Wyondotte, Mich. The former machine comprises a cylinder with openings through which the ferric chloride is pressed by a revolving roller inside the cylinder. A cutter on the outside of the cylinder cuts the pellets to the proper size as they are pressed through the openings. The pellets that are then formed are easier to handle and are not as hygroscopic as compared to the original ferric chloride, because of their smaller surface area, and tend not to foul equipment. The pellets of ferric chloride that are formed are then fed to a fluidized bed reactor along with the oxygen gas. In the pilot plant reactor that was used, the pellets were fed at a rate of 75 to 190 grams per minute and oxygen gas at 21 grams per minute. The feed rate will vary for other size equipment. In the reactor, most of the ferric chloride is converted to chlorine gas and ferric oxide residue. Unreacted oxygen gas is also given off. The temperature of reaction is generally in the range of 650° to 800° C. and preferrably 750° to 800° C.

Although elevated pressure may be used, it serves no useful purpose. Preferably the pressure is atmospheric. In the pilot plant, the fluidized-bed reactor was 3.75 inches in diameter by 51 inches tall. It can be appreciated that for different, and larger size equipment, the fluidized bed dimensions would be larger. To maintain the temperature of reaction at the proper level, it may be necessary to add a fuel to the reaction media. Thus, as one example, 5 to 15% by weight of metallic iron may be added as fuel to the reaction media based on the weight of ferric chloride. Other suitable fuel that will burn with oxygen may be used.

A catalyst may also be added to increase the conversion of ferric chloride to chlorine and $Fe_2O_3$. From 0.05 to 0.5% by weight of sodium chloride based on the weight of $Fe_2O_3$ may be added. The sodium chloride additive is preferably pelletized into the ferric chloride. However, it was noted that even though sodium chloride increased the yield of chlorine, nevertheless, in the runs it was used, the equipment became fouled. The fouling may or may not have been caused by the sodium chloride.

The present process was carried out in a fluidized-bed reactor where oxygen is emitted from a nozzle to burn ferric chloride pellets passing through the nozzle.

Accordingly, with the fluidized bed reactor there is produced chlorine gas mixed with unreacted oxygen. In some cases, the yield is up to 95% or more of chlorine from the ferric chloride. This gas is cycled to the titanium process or purified and stored, whatever is desirable. The ferric oxide that is formed from the process may be sold or can be disposed of in any suitable landfill. The examples below are given for the purpose of illustrating the invention, they are not given to set boundaries or limits to the invention.

EXAMPLE 1

Ferric chloride ($FeCl_3$) was pelletized to 1-mm dia by 2-mm pellets in a compaction type, rotary pellet mill. These pellets were then screw fed into a 1" dia by 6" tall pressurized glass chamber under about 3 psig oxygen. The pressure difference between the glass chamber and the fluid bed caused the ferric chloride to be swept up a ¼" I.D. stainless steel tube by the oxygen and shot into the bottom of the fluid-bed reactor. The high velocity of the pellets prevented their melting or sticking in the feed port. Oxygen was used in the reactor as both a fluidizing gas and a reactant. Enough oxygen was fed through the feed system such that no other fluidizing gas or reactant was needed. The gas stream exiting the reactor was cooled and filtered, and then analyzed for chlorine content with an ultraviolet absorption optical gas analyzer.

The fluid-bed reactor consisted of a 3.75" I.D. by 39" long quartz tube topped with a 12" high stainless steel cone in which the diameter increases from 4" at the bottom to 9" at the top. The bottom 15" of the reactor was filled with 12 lbs of ferric oxide. The ferric oxide was prepared by calcining reagentgrade ferric oxide for about 3 days at about 850° C. and then repeatedly roll crushed and screened to obtain a −48+270 mesh fraction. Under continuous operation, the bed material consists of the iron oxide produced by the dechlorination reaction and its size range is yet to be determined.

Before this test began, the bed material in the reactor was heated to about 750° C. with an external electric resistance heater. During the heat-up, the bed was fluidized with air. When the test began, oxygen replaced the air. Oxygen flow during the test was 21 g/min. The ferric chloride feed rate was 130–150 g/min and the extent of reaction calculated from the chlorine composition in the off-gas was about 70% . Results for two points during this test are given in table 1.

EXAMPLE 2

The procedure of this example was essentially the same as that of Example 1 except that new ferric oxide bed material was prepared specifically for this test and the bed temperature was 700° C. Results for three points during this test are given in table 1.

EXAMPLE 3

The procedure of this example was also essentially the same as that of Example 1, except that during part of the test the pellets contained 5% iron. The purpose of the iron was to generate heat via the reaction $2Fe + 3/2\ O_2 \rightarrow Fe_2O_3$. When the pellets containing 5% iron were fed, the bed temperature increased about 15° C. Results for two points, one with iron and one without, are given in Table 1.

EXAMPLE 4

The procedure of this example was also essentially the same as that of Example 1, except that during part of the test the ferric chloride pellets contained 0.5% NaCl. The purpose of the NaCl was to act as a catalyst. Results from this test for two points, one with NaCl and one without, are summarized in Table 1.

TABLE 1

| Example | Pellet composition | Pellet feed rate g/min | $O_2$ feed rate g/min | % of required oxygen | Reaction temperature °C. | Chlorine in exhaust % | Conversion of ferric chloride % |
|---|---|---|---|---|---|---|---|
| 1a | $FeCl_3$ | 132 | 21 | 107.5 | 735 | 80 | 71 |
| b | " | 146 | 21 | 97.4 | " | 86 | 73 |
| 2a | $FeCl_3$ | 134 | 21 | 105 | 690 | 84 | 77 |
| b | " | 189 | 21 | 75 | " | 94 | 67 |
| c | " | 165 | 21 | 86 | " | 95 | 78 |
| 3a | $FeCl_3$ | 149 | 21 | 97 | 760 | 78 | 62 |
| b | $FeCl_3$ + 5% Fe | 147 | 21 | 85.5 | 775 | 82 | 59 |
| 4a | $FeCl_3$ | 150 | 21 | 94 | 750 | 62 | 42 |
| b | $FeCl_3$ + 0.5% NaCL | 150 | 21 | 94 | 725 | 60 | 41 |

We claim:

1. A process for producing chlorine from ferric chloride, comprising:
   (a) forming ferric chloride pellets from ferric chloride powder;
   (b) passing oxygen gas in contact with the ferric chloride pellets at a temperature in the range of 650° to 800° C. in a reaction zone; and
   (c) withdrawing chlorine gas and unreacted oxygen gas from the reaction zone.

2. The process of claim 1 wherein the reaction zone is in a fluidized bed reactor and the fluidized bed is formed from ferric oxide particles.

3. The process of claim 1 wherein the ferric chloride pellets that are formed contained from 0.05 to 0.5% by weight of sodium chloride which is a catalyst based on the weight of ferric chloride.

4. The process of claim 3 wherein the fluidized bed is 3.75 inches in diameter, and 15-inches deep.

5. The process of claim 4 wherein the ferric chloride pellets that are formed are in the range 1 to 6 mm in diameter.

6. The process of claim 5 wherein the temperature in the reaction zone is the range of 700°–800° C.

7. The process of claim 6 wherein $Fe_2O_3$ is removed continuously from the reactor zone.

8. The process of claim 7 wherein there is added 5 to 15% by weight of metallic iron as fuel based on the weight of ferric chloride.

* * * * *